United States Patent
Choi et al.

(10) Patent No.: US 9,442,298 B2
(45) Date of Patent: Sep. 13, 2016

(54) LIQUID CRYSTAL DISPLAY PANEL AND METHOD FOR MANUFACTURING THE SAME

(71) Applicant: SAMSUNG DISPLAY CO., LTD., Yongin, Gyeonggi-Do (KR)

(72) Inventors: Chun Ki Choi, Yongin-Si (KR); Kang-Min Kim, Hwaseong-Si (KR); Yoon Kyung Park, Seoul (KR); Jin Oh Song, Seoul (KR); Seung Jun Jeong, Hwaseong-Si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 39 days.

(21) Appl. No.: 14/258,919

(22) Filed: Apr. 22, 2014

(65) Prior Publication Data
US 2015/0124183 A1    May 7, 2015

(30) Foreign Application Priority Data
Nov. 5, 2013  (KR) .................. 10-2013-0133657

(51) Int. Cl.
G02F 1/1333   (2006.01)
G02B 27/22    (2006.01)
G02F 1/1343   (2006.01)
G02F 1/1345   (2006.01)
G02F 1/29     (2006.01)

(52) U.S. Cl.
CPC ......... G02B 27/2214 (2013.01); G02F 1/1345 (2013.01); G02F 1/133345 (2013.01); G02F 1/134309 (2013.01); G02F 1/29 (2013.01); G02F 2001/294 (2013.01)

(58) Field of Classification Search
CPC ............... G02B 27/2214; G02F 1/133345; G02F 1/4309; G02F 1/1345; G02F 1/29
USPC .......................................................... 349/15
See application file for complete search history.

(56) References Cited

U.S. PATENT DOCUMENTS 8,358,399 B2    1/2013  Lee et al.
2009/0153653 A1*  6/2009  Lee .................... G02F 1/13471
                                                  348/59
2012/0236043 A1    9/2012  Jung et al.
2012/0300042 A1   11/2012  Yun et al.

FOREIGN PATENT DOCUMENTS

| JP | 2010-039444 | 2/2010 |
| JP | 2013-084744 | 5/2013 |
| KR | 10-2007-0081887 | 8/2007 |
| KR | 10-2010-0075301 | 7/2010 |
| KR | 10-2010-0075302 | 7/2010 |
| KR | 10-2012-0130397 | 12/2012 |
| KR | 10-2013-0046116 | 5/2013 |
| KR | 10-2013-0046998 | 5/2013 |

* cited by examiner

Primary Examiner — James Dudek
(74) Attorney, Agent, or Firm — F. Chau & Associates, LLP

(57) ABSTRACT

A liquid crystal display panel and a method for manufacturing the same are provided. The liquid crystal display panel includes a lens area and a peripheral area. The lens area includes a plurality of liquid crystal lenses. Each of the plurality of liquid crystal lenses includes a plurality of electrodes. The peripheral area surrounds the lens area. The peripheral area includes a first bus line layer and a second bus line layer facing each other in a first direction. The first and second bus line layers include first bus lines and second bus lines, respectively. The first and second bus lines are electrically connected to each of the plurality of electrodes through one end of each electrode.

13 Claims, 12 Drawing Sheets

LIQUID CRYSTAL DISPLAY PANEL AND METHOD FOR MANUFACTURING THE SAME

CROSS-REFERENCE TO RELATED PATENT APPLICATION

This application claims priority under 35 U.S.C §119 to Korean Patent Application No. 10-2013-0133657 filed on Nov. 5, 2013 in the Korean Intellectual Property Office, the disclosure of which is incorporated by reference herein in its entirety.

TECHNICAL FIELD

The present invention relates to a display device, and more particularly to liquid crystal display panel and a method for manufacturing the same.

DISCUSSION OF THE RELATED ART

A method for displaying a three-dimensional (3D) image may use binocular disparity. Binocular disparity may use a display device that sends distinct image to a viewer's left and right eyes. The distinct image may feature a common image observed from different angles. Thus, since images observed at different angles are input to both eyes of an observer, the observer may feel a 3D effect.

Methods for inputting the images to both eyes of the observer include a method of using a barrier, a method of using a lenticular lens (e.g., a cylindrical lens), or the like.

In the method of using the barrier, slits are formed in the barrier and thus the image from the display device is divided into left and right eye images through the slit to be input to each of the left and right eyes of the observer.

The 3D image display device using the lens displays the left eye image and the right eye image, respectively, and changes an optical path for the images using the lens to divide the images into the left eye image and the right eye image.

An image display device may be capable of displaying both of two-dimensional (2D) and 3D modes. A switchable lens that enables switching between the 2D and 3D modes has been developed.

SUMMARY

According to an exemplary embodiment of the present invention, a liquid crystal display panel is provided. The liquid crystal display panel includes a lens area and a peripheral area. The lens area includes a plurality of liquid crystal lenses. Each of the plurality of liquid crystal lenses includes a plurality of electrodes. The peripheral area surrounds the lens area. The peripheral area includes a first bus line layer and a second bus line layer facing each other in a first direction. The first bus line layer includes first bus lines and the second bus line layer includes second bus lines. The first and second bus lines are electrically connected to each of the plurality of electrodes through one end of each electrode. An insulating layer is formed between the first bus lines and the second bus lines. The first bus lines and the second bus lines are disposed alternatively in a second direction that is substantially vertical to the first direction.

An interval between adjacent bus lines may be substantially negligible.

The adjacent lines may at least partially overlap each other.

Each of the adjacent bus lines may have a common predetermined width and a width in which the adjacent bus lines overlap may be equal to about ⅓ or less of the common predetermined width.

An interval between the first bus lines may be substantially the same as or narrower than the common predetermined width.

An interval between the second bus lines may be substantially the same as or narrower than the common predetermined width.

The plurality of electrodes may includes first electrodes formed in a first electrode layer and second electrodes formed in a second electrode layer. An insulating layer may be formed between the first electrodes and the second electrodes. The first electrode layer and the second electrode layer may face each other in the first direction. The first bus lines may be electrically connected to each of the first electrodes and the second bus lines may be electrically connected to each of the second electrodes. The first and second bus lines may be electrically connected to each of the plurality of electrodes through the other end of each electrode.

A number of the first and second bus lines may be substantially the same as a number of the first and second electrodes.

The first and second bus lines may extend to surround at least a portion of the lens area.

At least one driving circuit may be disposed in the peripheral area and each of the first and second bus lines may be applied with a different voltage level from the driving circuit.

According to an exemplary embodiment of the present invention, a method for manufacturing a liquid crystal display panel is provided. The method includes forming a plurality of first bus lines on a substrate, forming a first insulating layer on the plurality of first bus lines, forming a plurality of second bus lines on the first insulating layer, forming a second insulating layer on the plurality of second bus lines, exposing at least a portion of each of the plurality of first bus lines through at least one first contact holes, forming a plurality of first electrodes and extensions of the plurality of first electrodes which are connected to the plurality of first bus lines, forming a third insulating layer on the second insulating layer, exposing at least a portion of each of the second bus lines through at least one second contact holes, and forming a plurality of second contact holes which expose a portion of each of the plurality of second bus lines. The substrate, the first insulating layer, the second insulating layer, and the third insulating layer face each other in a first direction.

Each of the first bus lines may have a common predetermined width.

An interval between adjacent first bus lines may be substantially the same as or narrower than the common predetermined width.

The first and second bus lines may be disposed alternatively in a second direction that is substantially vertical to the first direction. An interval between adjacent bus lines among the first bus lines and the second bus lines may be substantially negligible.

The first and second bus lines may be formed by depositing and patterning metal layers.

The first and second electrodes and extensions thereof may be formed by depositing and patterning a transparent conductive material.

The second bus lines may be formed of the same material and structure as the first bus lines.

The liquid crystal lens panel may be operated in a two dimensional mode and a three dimensional mode.

According to an exemplary embodiment of the present invention, a liquid crystal display panel is provided. The liquid crystal display panel includes a plurality of electrodes, a first bus line layer, and a second bus line layer. The first bus line layer includes a plurality of first bus lines. The second bus line layer includes a plurality of second bus lines. The first bus line layer and the second bus line layer face each other in a first direction. The first and second bus lines are disposed alternatively in a second direction that is substantially vertical to the first direction. The plurality of electrodes is electrically connected to the first and second bus lines.

A width in which the adjacent bus lines overlap may be equal to or less than about 4 μm.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

Figure 1:
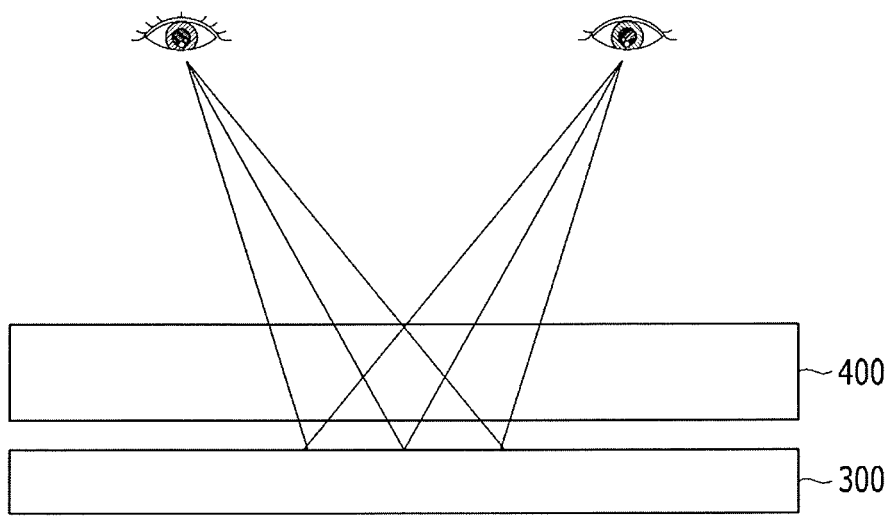
FIGS. 1 and 2 are diagrams illustrating a structure of a display device for displaying 2D and 3D images according to an exemplary embodiment of the present invention.

The present invention will be described more fully hereinafter with reference to the accompanying drawings, in which exemplary embodiments of the invention are shown. However, the present invention may be embodied in various different ways without departing from the spirit or scope of the present invention.

In the drawings, the thickness of layers, films, panels, regions, etc., may be exaggerated for clarity. Like reference numerals may refer like elements throughout the specification and drawings.

Hereinafter, a display device according to an exemplary embodiment of the present invention will be described in detail with reference to the accompanying drawings.

Figure 2:
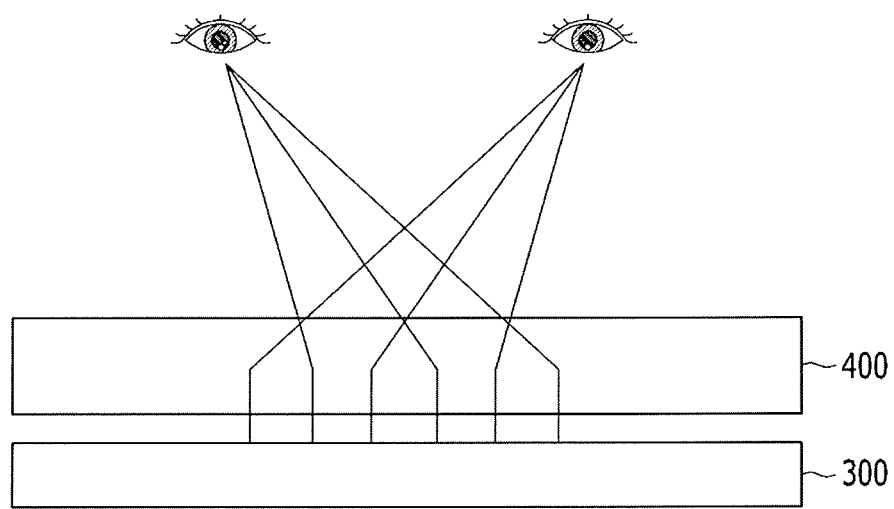

FIGS. 1 and 2 are diagrams illustrating a structure of a display device for displaying 2D and 3D images according to an exemplary embodiment of the present invention.

The display device includes a display panel 300 which displays an image and a liquid crystal lens panel 400 which is disposed in front of a surface (screen) on which an image of the display panel 300 is displayed. The display panel 300 and the liquid crystal lens panel 400 may be operated in either a 2D mode or a 3D mode.

The display panel 300 may include various flat panel displays such as a liquid crystal display, an organic light emitting device, a plasma display device, an electrophoretic display, or the like. The display panel 300 includes a plurality of pixels which may be arranged in a matrix form. In the 2D mode, the display panel 300 may display one 2D image. In the 3D mode, the display panel 300 may alternately display images corresponding to various viewing fields (e.g., a right eye image, a left eye image) by a spatial or temporal division method. For example, in the 3D mode, the display panel 300 may alternately display the right eye image and the left eye image for each pixel array.

In the 2D mode, the liquid crystal lens panel 400 transmits the image displayed on the display panel 300. In the 3D mode separates the viewing fields of the image displayed on the display panel 300. For example, the liquid crystal lens panel 400 operated in the 3D mode focuses a multi-view image, which includes the left eye image and the right eye image displayed on the display panel 300, on a corresponding viewing field for each view image by using diffractive and refractive phenomena of light.

FIG. 1 illustrates a case where the display panel 300 and the liquid crystal lens panel 400 are operated in the 2D mode. As illustrated in FIG. 1, the same image arrives at the left and right eyes of an observer and thus, the 2D image is recognized. FIG. 2 illustrates a case where the display panel 300 and the liquid crystal lens panel 400 are operated in the 3D mode. As illustrated in FIG. 2, the liquid crystal lens panel 400 separates the image of the display panel 300 into distinct viewing fields (e.g., the left eye and the right eye) and refracts the divided image. Thus, the 3D image is recognized.

Figure 3:
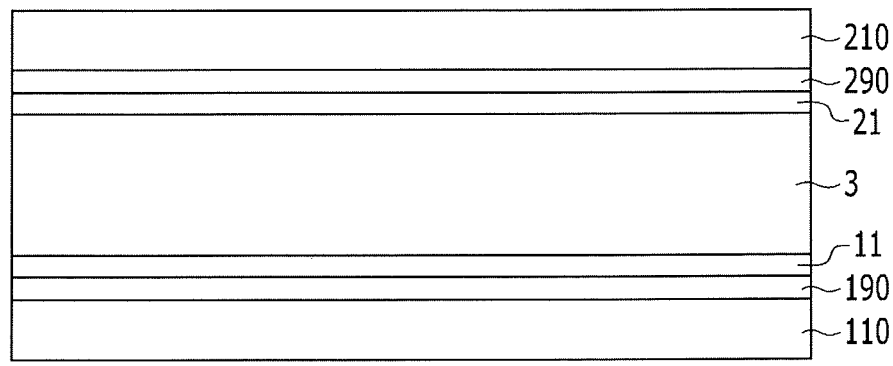
FIG. 3 is a cross-sectional view illustrating a layer structure of a lens area of a liquid crystal lens panel according to an exemplary embodiment of the present invention.

FIG. 3 is a cross-sectional view illustrating a layer structure of a lens area of a liquid crystal lens panel according to an exemplary embodiment of the present invention.

Referring to FIG. 3, the liquid crystal panel 400 includes a first substrate 110 and a second substrate 210. The first substrate 110 and the second substrate 210 may be made of an insulating material such as glass and plastic or may face each other. A liquid crystal layer 3 is interposed between the two substrates 110 and 210. One or more polarizers (not illustrated) may be provided outside the substrates 110 and 210.

A first electrode layer 190 and an alignment layer 11 may be sequentially formed on the first substrate 110 and may be interposed between the first substrate 110 and the liquid crystal layer 3. A second electrode layer 290 and an alignment layer 21 may be sequentially formed on a second substrate 210 and may be interposed between the second substrate 210 and the liquid crystal layer 3.

The first electrode layer 190 and the second electrode layer 290 may include a plurality of electrodes and may be made of a transparent conductive material such as indium tin oxide (ITO) and indium zinc oxide (IZO). The first electrode layer 190 and the second electrode layer 290 generate an electric field in the liquid crystal layer 3 depending on a voltage applied between the two electrode layers 190 and 290 and control an orientation of liquid crystal molecules of the liquid crystal layer 3.

The alignment layers 11 and 21 determine an initial orientation of the liquid crystal molecules of the liquid crystal layer 3 and predetermine the orientation of the liquid crystal molecules, such that the liquid crystal molecules may be rapidly oriented depending on the electric field generated in the liquid crystal layer 3.

The liquid crystal layer 3 may be aligned in various modes, such as a horizontal alignment mode, a vertical alignment mode, a twisted nematic (TN) mode, or the like.

The liquid crystal lens panel 400 is operated in either the 2D mode or the 3D mode depending on the voltage applied to the first electrode layer 190 and the second electrode layer 290. For example, when the voltage is not applied to the first electrode layer 190 nor the second electrode layer 290, the liquid crystal lens panel 400 may be operated in the 2D mode. When the voltage is applied to the first electrode layer 190 and the second electrode layer 290, the liquid crystal lens panel 400 may be operated in the 3D mode. For this purpose, the initial orientation of liquid crystal molecules 31 and a transmissive axis direction of the polarizer may be properly controlled.

Hereinafter, the liquid crystal lens panel 400 operated in the 3D mode will be described.

The liquid crystal lens panel 400 operated in the 3D mode includes a plurality of unit liquid crystal lenses. The plurality of unit liquid crystal lenses may be repeatedly arranged at a predetermined period in one direction of the liquid crystal lens panel 400. A position of the unit liquid crystal lens within the liquid crystal lens panel 400 may be fixed, or may be changed over time.

A unit liquid crystal lens may be implemented as a Fresnel zone plate. The Fresnel zone plate serves as a lens by using diffraction of light through a plurality of concentric circles. The plurality of concentric circles may be radially arranged like a Fresnel zone and an interval among the concentric circles may be narrowed toward an outside from the center.

Figure 4:
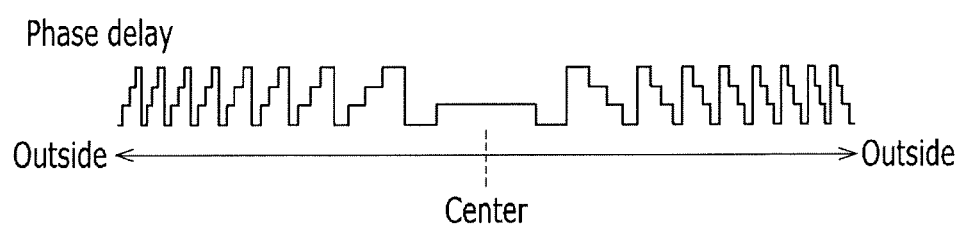
FIG. 4 is a graph illustrating a phase delay change depending on a position of a Fresnel zone plate of a phase modulation type.

FIG. 4 is a graph illustrating a phase delay change depending on a position of a Fresnel zone plate of a phase modulation type. In this case, each zone of the Fresnel zone plate becomes a region to which each of the waveforms repeated in the graph belongs.

Referring to FIG. 4, a phase delay is changed to a stepped form in each zone. In the zone which is disposed at the center, the phase delay is changed in two steps, and in the zones except for the center, the phase delays are changed in four steps. However, in the present inventive concept, the number of steps in which the phase delay in each zone is changed is not limited thereto.

As illustrated in FIG. 4, the Fresnel zone plate in which the phase delay in each zone is changed in the stepped form is referred to as a "multi-level phase modulation zone plate". The liquid crystal lens panel may refract light to be collected at a focus position by using diffraction, destructive interference, and constructive interference of light which transmits each zone. As described above, a lens effect may be generated by forming the phase delay distribution along the Fresnel zone plate for each unit liquid crystal lens of the liquid crystal lens panel.

Figure 5:
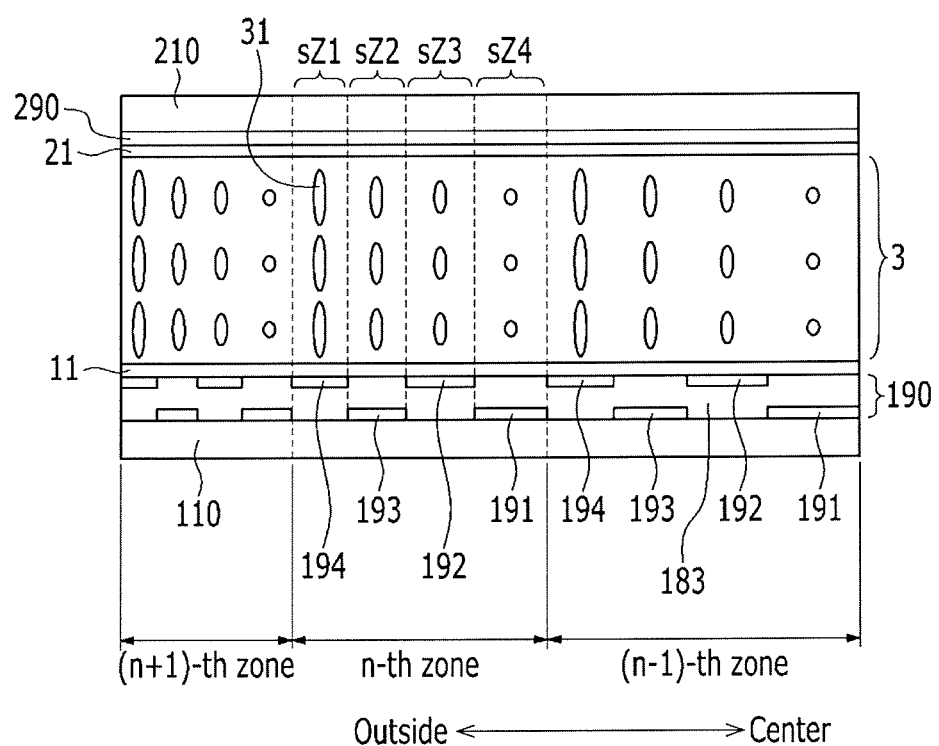
FIG. 5 is a cross-sectional view illustrating a portion of a unit liquid crystal lens in a liquid crystal lens panel according to an exemplary embodiment of the present invention.

FIG. 5 is a cross-sectional view illustrating a portion of the unit liquid crystal lens in the liquid crystal lens panel according to an exemplary embodiment of the present invention. The same constituent elements as the exemplary embodiment of FIG. 3 may refer to the same reference numerals, and thus, the duplicated description may be omitted.

Referring to FIG. 5, the liquid crystal lens panel includes the first substrate 110 and the second substrate 210 which face each other and the liquid crystal layer 3 which is interposed between the two substrates 110 and 210. The first electrode layer 190 and the alignment layer 11 may be sequentially formed on the first substrate 110 and may be interposed between the first substrate 110 and the liquid crystal layer 3. The second electrode layer 290 and the alignment layer 21 may be sequentially formed on the second substrate 210 and may be interposed between the second substrate 210 and the liquid crystal layer 3.

The first electrode layer 190 includes a plurality of electrodes which are formed on one or more layers (e.g., two layers) having an insulating layer between the layers. For example, the first electrode layer 190 may include first electrodes 191 and 193 and second electrodes 192 and 194 which are formed on the insulating layer 183 formed on the first electrodes.

The first electrodes 191 and 193 and the second electrodes 192 and 194 may be alternately disposed to each other in a horizontal direction and might not overlap each other. The horizontal direction is substantially parallel to the surface of the first substrate 110 (or the second substrate 210) and a surface of FIG. 5. FIG. 5 illustrates that edges of the adjacent first electrodes 191 and 193 and second electrodes 192 and 194 do not fully overlap each other, but a portion of the edges may slightly overlap each other.

A horizontal direction width of each of the first electrodes 191 and 193 and the second electrodes 192 and 194, an interval between the first electrodes 191 and 193, and an interval between the second electrodes 192 and 194 are gradually narrowed toward the outside of the unit liquid crystal lens from the center thereof and are gradually narrowed toward the outside from the center in each zone. Like an n−1-th zone, an n-th zone, and an n+1-th zone, the two first electrodes 191 and 193 and the two second electrodes 192 and 194 are disposed in each zone of the unit liquid crystal lens. In each zone, a region in which each electrode 191, 192, 193, and 194 is disposed forms one sub-zone sZ1, sZ2, sZ3, and sZ4. Referring to FIG. 5, for example, in one zone (e.g., n-th zone), the sub zones from the outer side to the center are sequentially represented by sZ1, sZ2, sZ3, and sZ4. FIG. 5 illustrates that a single zone includes four sub zones sZ1, sZ2, sZ3, and sZ4, but the number of sub zones in each zone is not limited thereto. Unlike those illustrated in FIG. 5, the horizontal direction width of the first electrodes 191 and 193 and the second electrodes 192 and 194 included in one zone may be uniform, and the number of electrodes included in each zone may also be reduced toward the outside zone.

The insulating layer 183 electrically insulates the first electrodes 191 and 193 from the second electrodes 192 and 194. The insulating layer 183 may be made of an inorganic insulating material (e.g., silicon nitride (SiNx), silicon oxide (SiOx), and silicon oxynitride (SiONx)) and an organic insulating material.

The second electrode layer 290 is formed on the whole surface of the second substrate 210 and is applied with a predetermined voltage such as a common voltage Vcom.

The second electrode layer 290 may be made of a transparent conductive material such as ITO or IZO.

The alignment layers 11 and 21 may be rubbed in a length direction (e.g., direction vertical to the surface of FIG. 5), which is vertical to a width direction (e.g., the horizontal direction) of the first electrodes 191 and 192 and the second electrodes 192 and 194, or in a direction having a predetermined angle to the length direction. The rubbing directions of the alignment layers 11 and 21 may be opposite to each other.

The liquid crystal molecules 31 of the liquid crystal layer 3 may be initially oriented in a direction which is horizontal to the surfaces of the substrates 110 and 210, but the alignment mode of the liquid crystal layer 3 is not limited thereto. For example, the liquid crystal molecules 31 of the liquid crystal layer 3 may be initially aligned in a direction which is substantially vertical to the surfaces of the substrates 110 and 210.

Polarity of voltage applied to the first electrode layer 190 with respect to the common voltage Vcom may be inverted for each zone, in which the inversion is referred to as a "space inversion". Hereinafter, the polarity of the voltage applied to the first electrode layer with respect to the common voltage Vcom is in short referred to as a "polarity of the voltage applied to the first electrode layer". Thus, directions of electric fields which are generated in adjacent zones may be opposite to each other Further, the polarity of the voltage applied to each electrode of the first electrode layer 190 may be inverted at a time (e.g., a frame) period, in which the inversion is referred to as a "time inversion".

Figure 6:
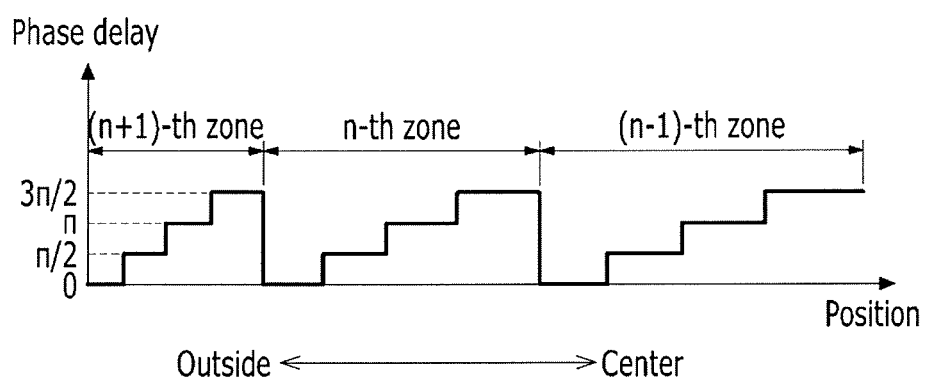
FIG. 6 is a diagram illustrating a phase delay formed depending on a position in a unit liquid crystal lens of FIG. 5, according to an exemplary embodiment of the present invention.

FIG. 6 is a diagram illustrating a phase delay formed depending on a position in a unit liquid crystal lens of FIG. 5, according to an exemplary embodiment of the present invention. The liquid lens panel is implemented as a phase modulation type Fresnel zone plate for each unit liquid crystal lens.

Referring to FIG. 6, the phase delay in each of the n−1-th zone, the n-th zone, and the n+1-th zone of the unit liquid crystal lens is changed over four steps. Thus, the liquid crystal lens panel forms the phase delay distribution depending on the Fresnel zone plate and generates the lens effect. The phase delay in each of the plurality of zones is stepwise increased toward the center from the outside. The same sub zone in each zone may generate the same phase delay. In the zone boundary, a slope of the phase delay with respect to the position may be substantially vertical.

Figure 7:
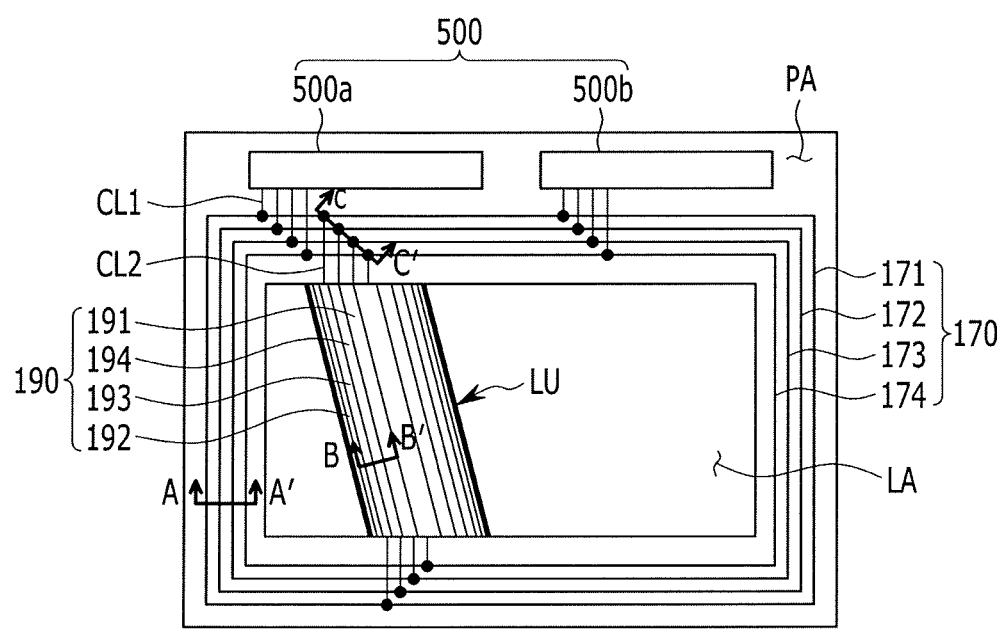
FIG. 7 is a plan view of the liquid crystal lens panel, according to an exemplary embodiment of the present invention.
Figure 8:
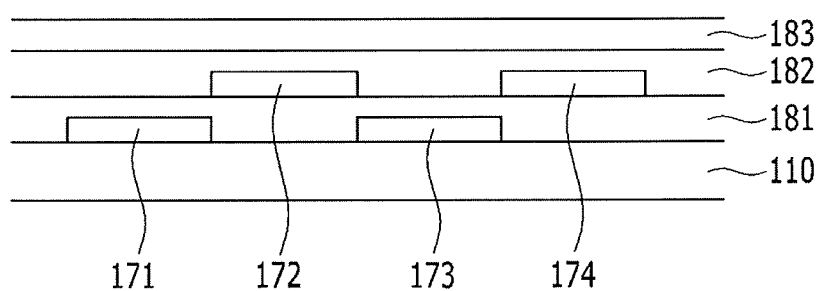
FIG. 8 is a cross-sectional view of a first substrate side taken along the line A-A' of FIG. 7, according to an exemplary embodiment of the present invention.
Figure 9:
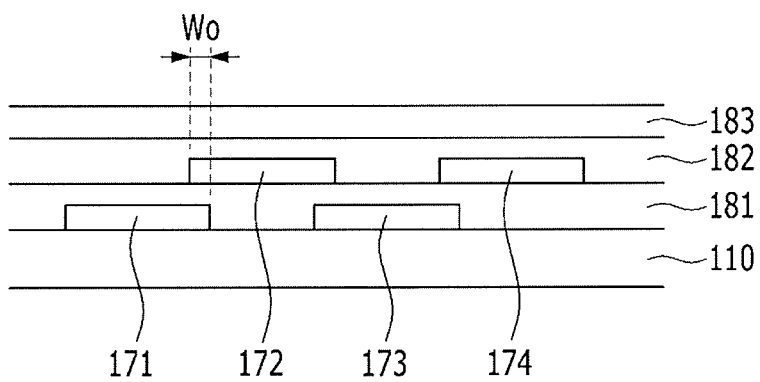
FIG. 9 is a cross-sectional view illustrating a modified example of FIG. 8, according to an exemplary embodiment of the present invention.

FIG. 7 is a plan view of the liquid crystal lens panel according to an exemplary embodiment of the present invention, FIG. 8 is a cross-sectional view of a first substrate side taken along the line A-A' of FIG. 7, and FIG. 9 is a cross-sectional view illustrating a modified example of FIG. 8. The same constituent elements as constituent elements illustrated in the previous drawings may be denoted by the same reference numerals. Thus, the duplicated description thereof may be omitted.

Referring to FIG. 7, the liquid crystal lens panel includes a lens area LA and a peripheral area PA surrounding the lens area LA.

A plurality of unit liquid crystal lenses LUs are disposed in the lens area LA. Each unit liquid crystal lens LU may include a plurality of zones. The electrodes (e.g., the first and second electrodes 191, 192, 193, and 194 which extend in parallel with each other) of the first electrode layer 190 of the liquid crystal lens panel are included in, for example, each zone. These electrodes 191, 192, 193, and 194 of the first electrode layer 190 may be formed to be inclined at a predetermined angle to prevent a moire phenomenon.

A driving unit 500 for driving the unit liquid crystal lens LU within the lens area LA may be disposed in the peripheral area PA. The driving unit 500 may include at least one driving circuit 500a and 500b. As a size of the liquid crystal lens panel is increased, the number of driving circuits may be increased. The drawings illustrate that the driving circuits 500a and 500b are disposed over the liquid crystal lens panel, but the position of the driving circuits 500a and 500b in the present inventive concept is not limited thereto. For example, the driving circuits 500a and 500b may be disposed at the upper, lower, left, and/or right sides of the liquid crystal lens panel.

A bus line layer 170 including a plurality of bus lines 171, 172, 173, and 174 is disposed in the peripheral area PA. The driving circuits 500a and 500b are electrically connected to the bus lines 171, 172, 173, and 174 of the bus line layer 170. The bus lines 171, 172, 173, and 174 are electrically connected to each of the electrodes 191, 192, 193, and 194 of the unit liquid crystal line LU to apply an output voltage from the driving circuits 500a and 500b to each of the electrodes 191, 192, 193, and 194 through each of the bus lines 171, 172, 173, and 174. Even though only the four bus lines 171, 172, 173, and 17 are illustrated for simplicity of the drawings, the bus line layer 170 may include the number of bus lines which substantially corresponds to the number of electrodes of the first electrode layer 190 of the unit liquid crystal lens LU. According to an exemplary embodiment of the present invention, there may be up to tens or hundreds of bus line.

The bus lines 171, 172, 173, and 174 are disposed to be substantially parallel with each other. The bus lines 171, 172, 173, and 174 may extend to surround the lens area LA. For example, the bus lines 171, 172, 173, and 174 may have a substantially rectangular shape as illustrated in FIG. 7. However, according to an exemplary embodiment of the present invention, the bus lines 171, 172, 173, and 174 may extend to surround only a portion of the lens area LA (for example, upper side and/or right side). The bus lines 171, 172, 173, and 174 may be disconnected at a specific portion and might not be continuous. Each of the bus lines 171, 172, 173, and 174 may have a width of about 10 μm to 15 μm.

The bus lines 171, 72, 173, and 174 may be electrically connected to the driving circuits 500a and 500b through a first connection line CL1 and may be electrically connected to the electrodes 191, 192, 193, and 194 of the unit liquid crystal lens LU through a second connection line CL2.

The bus lines 171, 172, 173, and 174 may be made of metal such as titanium (Ti), copper (Cu), molybdenum (Mo), aluminum (Al), tungsten (W), or a material including the same. The bus lines 171, 172, 173, and 174 may be formed of a single layer or a double layer (for example, Ti/Cu). The first connection line CL1 may be made of the same material as the bus lines 171, 172, 173, and 174 or may be made of the same material as the electrodes 191, 192, 193, and 194 of the unit liquid crystal lens LU. The second connection line CL2 may be an extension of the electrodes 191, 192, 193, and 194. For example, ends of the electrodes 191, 192, 193, and 194 may extend from the lens area LA to be electrically connected to the bus lines 171, 172, 173, and 174.

Each of the bus lines 171, 172, 173, and 174 may be applied with a voltage having different levels from the driving circuits 500a and 500b. Ends of the electrodes 191, 192, 193, and 194 of the unit liquid crystal lens LU may be electrically connected to each of the bus lines 171, 172, 173, and 174 to be applied with the voltage having different levels. In addition, the other ends of the electrodes 191, 192, 193, and 194 of the unit liquid crystal lens LU may be connected to the same bus lines as the bus lines 171, 172, 173, and 174 to which ends of the electrodes 191, 192, 193, and 194 are connected In this case, both ends of each of the electrodes 191, 192, 193, and 194 may be applied with the same voltage to reduce a voltage drop, which is particularly useful in a case in which the liquid crystal lens panel is large.

Referring to FIGS. 8 and 9, the bus line layer 170 includes the plurality of bus lines 171, 172, 173, and 174. The plurality of bus lines 171, 172, 173, and 174 may be arranged in one or more layers (e.g., two layers) in the horizontal direction, having the insulating layer therebetween. For example, the bus line layer 170 may include the first bus lines 171 and 173 and the second bus lines 172 and 174 formed on a first insulating layer 181 which is formed on the first bus lines 171 and 173. When the bus line layer 170 is formed in more than two layers (e.g., in a double layer) as described above, even though an interval between adjacent bus lines (e.g., a first bus line and a second bus line) in the horizontal direction does not exist, a short circuit between the adjacent bus lines might not occur. Thus, the entire width of the bus line layer 170 may be reduced and a width of the peripheral area PA occupied by the bus line layer 170 may be reduced.

According to an exemplary embodiment of the present invention as illustrated in FIGS. 8 and 9, the first bus lines 171 and 173 are disposed under the second bus lines 172 and 174. Hereinafter, the former (e.g., the first bus lines 171 and 173) may be referred to as a "lower bus line" and the latter (e.g., the second bus line 172 and 174) may be referred to as an "upper bus line". Similarly, the first electrodes 191 and 193 are disposed under the second electrodes 192 and 194. Hereinafter, the former (e.g., the first electrodes 191 and 193) may be referred to as a "lower electrode" and the latter (e.g., the second electrodes 192 and 194) may be referred to as an "upper electrode". To facilitate the connection between each of the bus lines 171, 172, 173, and 174 formed in the double layer and each of the electrodes 171, 172, 173, and 174, for example, the first bus lines 171 and 173 may be connected to the first electrodes 191 and 193, respectively and the second bus lines 172 and 174 may be connected to the second electrodes 192 and 194, respectively.

In the horizontal direction, the first bus lines 171 and 173 and the second bus lines 172 and 174 might not overlap each other as illustrated in FIG. 8, or a portion thereof may overlap each other as illustrated in FIG. 9. When the first bus lines 171 and 173 and the second bus lines 172 and 174 do not overlap each other, the interval between the first bus lines 171 and 173 and the second bus lines 172 and 174 may be substantially negligible. When the first bus lines 171 and 173 and the second bus lines 172 and 174 overlap each other, an overlapping width Wo may be about ⅓ or less of the width of the bus line in consideration of capacitance. For example, when the width of the bus line is about 12 μm, the overlapping width Wo may be equal to or less than about 4 μm.

To apply the common voltage Vcom to the second electrode layer 290, a voltage transfer line connected to a voltage source is formed in the peripheral area PA. Thus, the second electrode layer 290 may be short-circuited to the voltage transfer line through a short point in the peripheral area PA.

FIGS. 10 to 16 are flow charts illustrating a method of manufacturing a sectional portion of a first substrate side taken along the line B-B' in FIG. 7 and a sectional portion of the first substrate side taken along the line C-C'.

Referring back to FIG. 7, the line B-B' (hereinafter, referred to as an "electrode layer side") is shown as crossing the electrodes 191, 192, 193, and 194 portions of the first electrode layer 190 in the unit liquid crystal lens LU and the line C-C' (hereinafter, referred to as a "bus line layer side") is shown as crossing a portion of the bus line layer 170 in which the extensions of the electrodes 191, 192, 193, and 194 are electrically connected to the bus lines 171, 172, 173, and 174 of the bus line layer 170 through a contact hole Similarly, even though only the four bus lines and the four electrodes are illustrated for simplicity of the drawings, one unit liquid crystal lens may include tens to hundreds of electrodes and the number of bus lines may substantially correspond to the number of electrodes which is included in the one unit liquid crystal lens.

Figure 10:
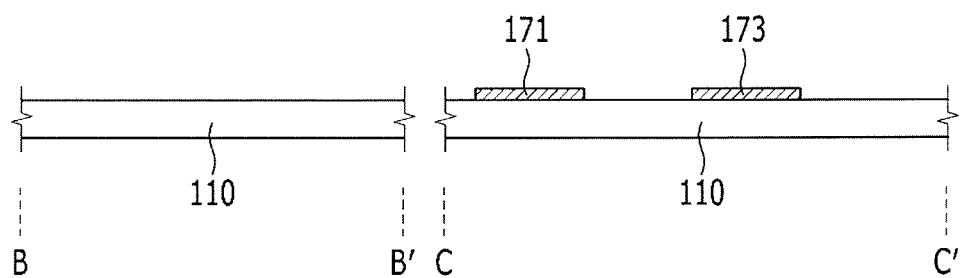
FIGS. 10 to 16 are flow charts illustrating a process of manufacturing a sectional portion of a first substrate side taken along the line B-B' in FIG. 7 and a sectional portion of the first substrate side taken along the line C-C', according to an exemplary embodiment of the present invention.

Referring to FIG. 10, a process of forming the first bus lines 171 and 173 on the first substrate 110 with a predetermined interval is first performed. The first bus lines 171 and 173 may be formed by stacking metal (e.g., titanium, copper, molybdenum, aluminum, tungsten, chromium, or an alloy thereof) in a single layer or a double layer based on, for example, a sputtering method and performing patterning thereon based on a photolithography process and an etching process. For the first bus lines 171 and 173, various conductive materials including a conductive polymer in addition to the metal materials may also be used. The first bus lines 171 and 173 may also be made of a transparent conductive material such as ITO, IZO, ZnO, or the like. The first bus lines 171 and 173 may have the same width and the interval between the adjacent first bus lines 171 and 173 may be substantially the same as or narrower than the width of the first bus lines 171 and 173.

Figure 11:
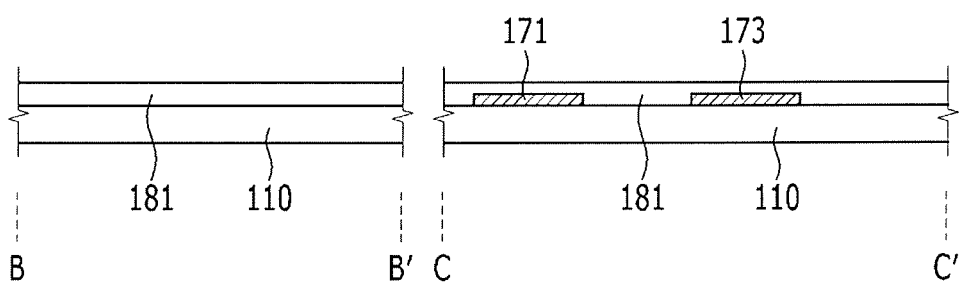

Referring to FIG. 11, a process of forming the first insulating layer 181 is performed. At the bus line layer side, the first insulating layer 181 is formed on the first substrate 110 and the first bus lines 171 and 173. At the electrode layer side, the first insulating layer 181 is formed only on the first substrate 110. The first insulating layer 181 may be formed by depositing SiOx, SiNx, or the like in a single layer or a double layer based on a deposition method such as plasma enhanced chemical vapor deposition (PECVD), atmospheric pressure chemical vapor deposition (APCVD), low pressure chemical vapor deposition (LPCVD), or the like.

Figure 12:
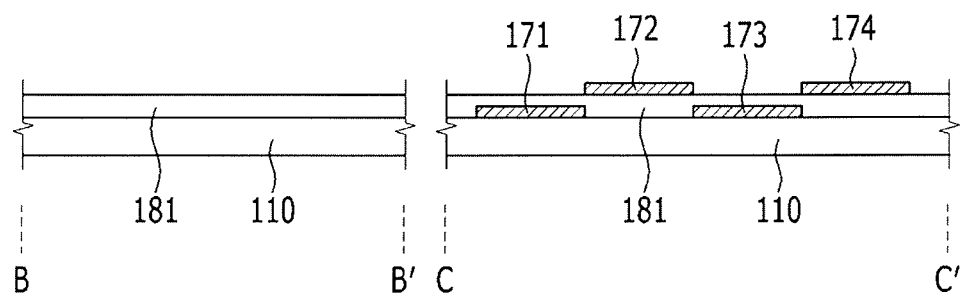

Referring to FIG. 12, a process of forming the second bus lines 172 and 174 on the first insulating layer 181 with a predetermined interval is performed. Each of the second bus lines 172 and 174 is formed to be disposed between the first bus lines 171 and 173 in the horizontal direction. The second bus lines 172 and 174 may partially overlap the first bus lines 171 and 173, or might not overlap the first bus lines 171 and 173. The second bus lines 172 and 174 may be formed by stacking and patterning a conductive layer. The second bus lines 172 and 174 may be formed to have the same material and structure (e.g., a width, a thickness) as the first bus lines 171 and 173 and thus, the second bus lines 172 and 174 may have the same electric characteristics as the first bus lines 171 and 173.

Figure 13:
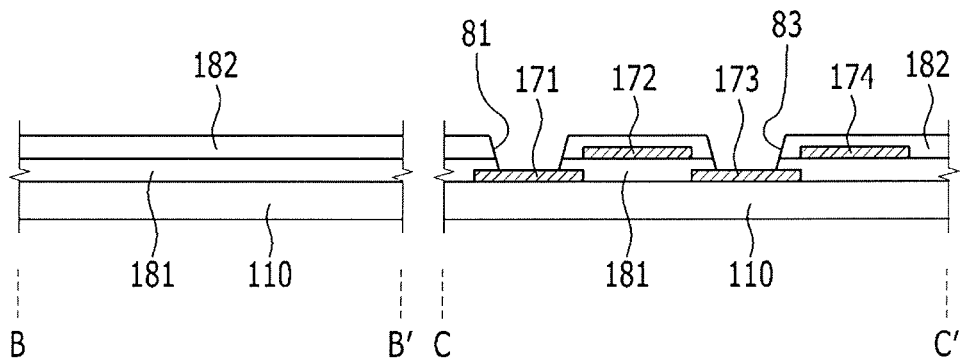

Referring to FIG. 13, a process of partially exposing the first bus lines 171 and 173 through first contact holes 81 and 83 by stacking and patterning the second insulating layer 182 is performed. The second insulating layer 182 may be made of the materials and the methods which are exemplified in connection with the first insulating layer 181. The electrode layer side is in a state in which only the first and second insulating layers 181 and 182 are sequentially stacked on the first substrate 110.

Figure 14:
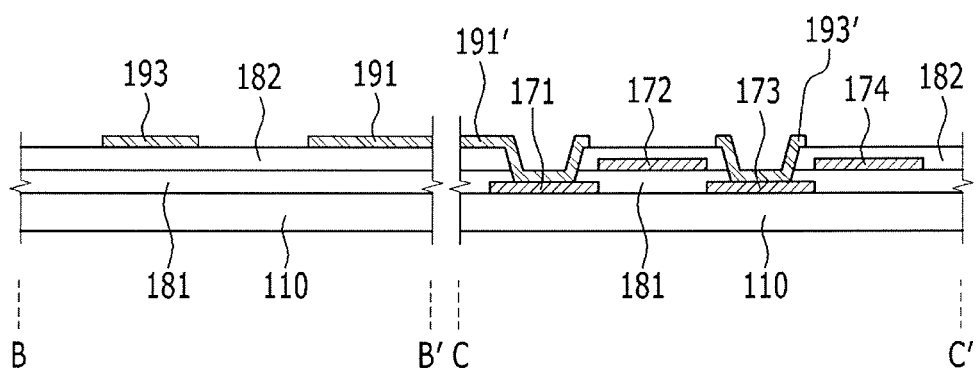

Referring to FIG. 14, a process of forming the first electrodes 191 and 193 and extensions 191' and 193' of the first electrodes 191 and 193 is performed. The first electrodes 191 and 193 and the extensions 191' and 193' thereof may be formed by stacking and patterning the transparent conductive material such as ITO, IZO, or the like. For example, the extension 191' of the electrode 191 is electrically connected to the bus line 171 through the contact hole 81 and the extension 193' of the electrode 193 is electrically connected to the bus line 173 through the contact hole 83.

Figure 15:
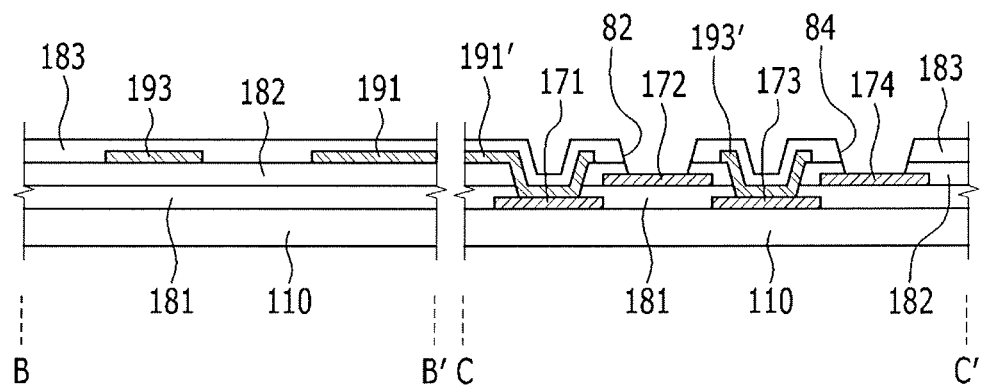

Referring to FIG. 15, a process of partially exposing the second bus lines 172 and 174 through second contact holes 82 and 84 by stacking and patterning a third insulating layer 183 is performed. The third insulating layer 183 may be made of the materials and the methods which are exemplified in connection with the first insulating layer 181.

Figure 16:
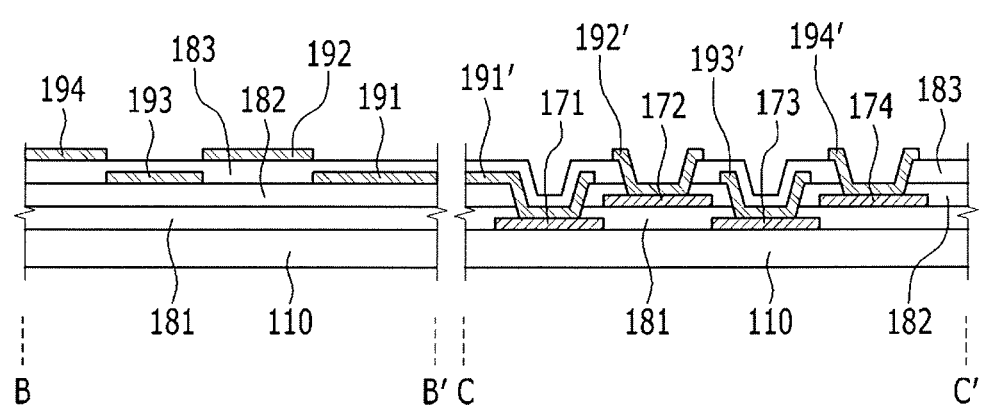

Referring to FIG. 16, a process of forming the second electrodes 192 and 194 and extensions 192' and 194' of the second electrodes is performed. The second electrodes 192 and 194 might not fully overlap the first electrodes 191 and 193, or may partially overlap the first electrodes 191 and 193. The second electrodes 192 and 194 and the extensions 192' and 194' thereof may be formed by stacking and patterning the same material as the first electrodes 191 and 193. The extension 192' of the electrode 192 is electrically connected to the bus line 172 through the contact hole 82 and the extension 194' of the electrode 194 is electrically connected to the bus line 174 through the contact hole 84.

In addition, the first substrate 110 may be bonded to the second substrate 210 on which the second electrode layer 290 is formed and thus, the liquid crystal lens panel may be completely formed. The liquid crystal layer 3 may be formed by either dropping the liquid crystal material into one of the first and second substrates 110 and 210 before the first substrate 110 is bonded to the second substrate 210 or injecting the liquid crystal material after the two substrates 110 and 210 are bonded to each other.

Figure 17:
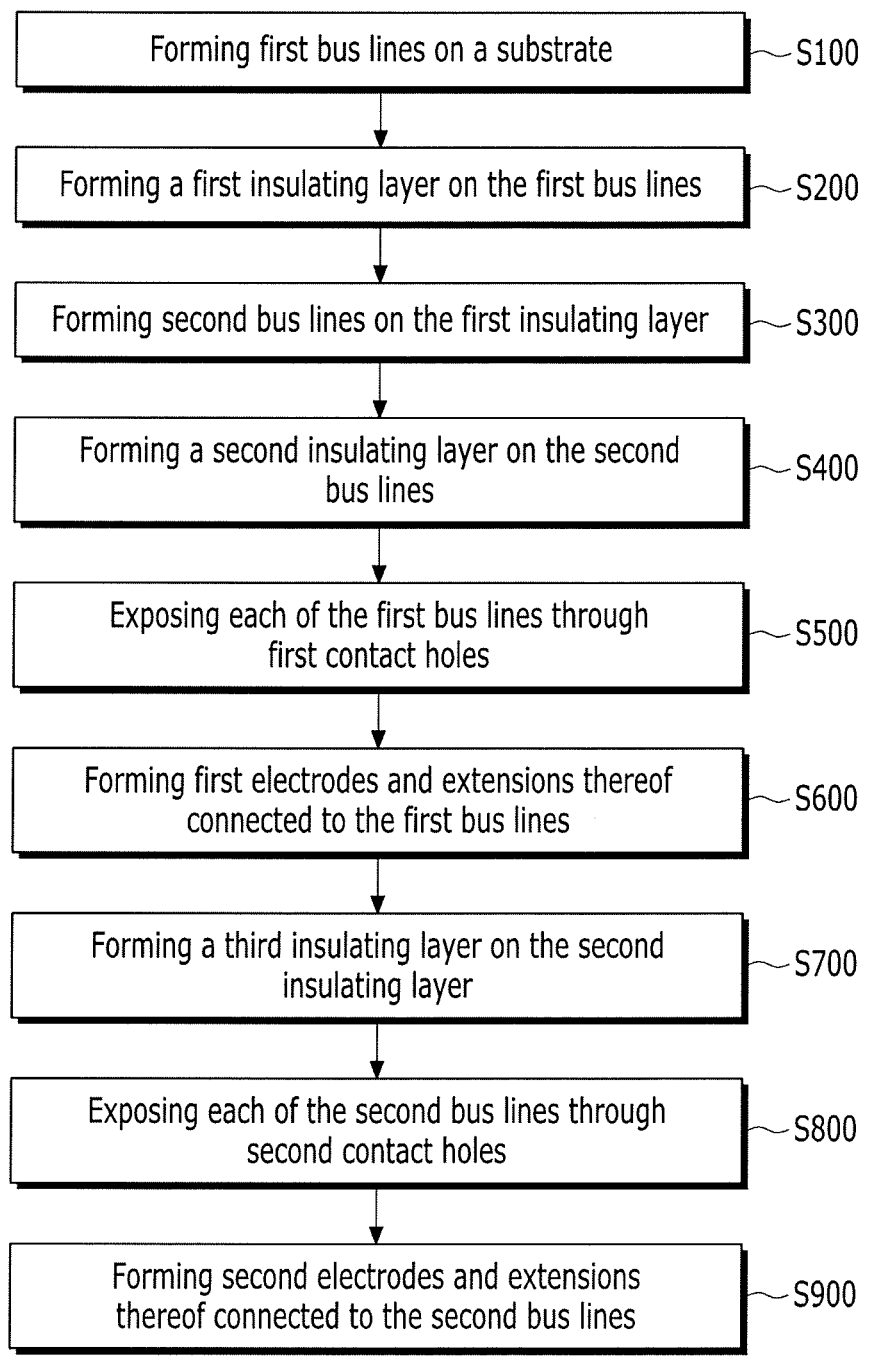
FIG. 17 is a flow chart illustrating a method of manufacturing a liquid crystal lens according to an exemplary embodiment of the present invention.

FIG. 17 is a flow chart illustrating a method of manufacturing a liquid crystal lens according to an exemplary embodiment of the present invention.

Referring to FIG. 17, a method of manufacturing a liquid crystal lens according to an exemplary embodiment of the present invention may include forming first bus lines on a substrate (S100), forming a first insulating layer on the first bus lines (S200), forming second bus lines on the first insulating layer (S300), forming a second insulating layer on the second bus lines (S400), and exposing at least a portion of each of the first bus lines through at least one first contact holes (S500).

The method may further include forming first electrodes and extensions of the first electrodes which are connected to the first bus lines (S600), forming a third insulating layer on the second insulating layer (S700), exposing at least a portion of each of the second bus lines through at least one second contact holes (S800), and forming second electrodes and extensions of the second electrodes which are connected to the second bus lines (S900).

Here, the substrate, the first insulating layer, the second insulating layer, and the third insulating layer face each other in a first direction.

In S100, the first bus lines may have a same predetermined width, and an interval between adjacent first bus lines may be substantially the same as or narrower than the same predetermined width.

In S100 and S200, the first bus lines and the second bus lines may be disposed alternatively in a second direction, substantially vertical to the first direction, and an interval between adjacent bus lines among the first bus lines and the second bus lines might not substantially be present. In addition, the first and second bus lines may be formed by depositing and patterning metal layers, and the first and second electrodes and extensions thereof may be formed by depositing and patterning a transparent conductive material. In addition, the second bus lines may be formed of the same material and structure as the first bus line.

Although the present inventive concept has been described in connection with exemplary embodiments thereof, it will be understood that the present inventive concept is not limited to the disclosed embodiments and various changes in forms and details may be made therein without departing from the spirit and scope of the present inventive concept.

What is claimed is:

1. A liquid crystal lens panel, comprising:
a lens area including a plurality of liquid crystal lenses, wherein each of the plurality of liquid crystal lenses includes a plurality of electrodes disposed over a substrate; and
a peripheral area surrounding the lens area, wherein the peripheral area includes a first bus line layer and a second bus line layer,
wherein the first and second bus line layers are disposed over the substrate,
wherein the second bus line layer is disposed over the first bus line layer in a first direction that is substantially vertical to a surface of the substrate,
wherein the first bus line layer includes a plurality of first bus lines and the second bus line layer includes a plurality of second bus lines, the first bus lines being electrically insulated from the second bus lines without any contact between the first bus lines and the second bus lines,
wherein the first and second bus lines are electrically connected to the plurality of electrodes through one end of each electrode,
wherein an insulating layer is disposed between the first bus lines and the second bus lines in the first direction, and
wherein each of the first bus lines is alternately arranged with respect to each of the second bus lines along a second direction that is substantially vertical to the first direction.

2. The liquid crystal lens panel of claim 1, wherein:
an interval in the second direction between adjacent bus lines among the first bus lines and the second bus lines is substantially zero.

3. The liquid crystal lens panel of claim 1, wherein: adjacent bus lines among the first bus lines and the second bus lines at least partially overlap each other.

4. The liquid crystal lens panel of claim 3, wherein:
each of the adjacent bus lines has a common predetermined width and a width in which the adjacent bus lines overlap is equal to about ⅓ or less of the common predetermined width.

5. The liquid crystal lens panel of claim 1, wherein:
each of the first bus lines and the second bus lines has a common predetermined width.

6. The liquid crystal lens panel of claim 5, wherein:
an interval between the first bus lines is substantially the same as or narrower than the common predetermined width, and
an interval between the second bus lines is substantially the same as or narrower than the common predetermined width.

7. The liquid crystal lens panel of claim 1, wherein:
the plurality of electrodes includes first electrodes formed in a first electrode layer and second electrodes formed in a second electrode layer and an insulating layer is formed between the first electrodes and the second electrodes,
wherein the first electrode layer and the second electrode layer face each other in the first direction, and
wherein the first bus lines are electrically connected to each of the first electrodes and the second bus lines are electrically connected to each of the second electrodes.

8. The liquid crystal lens panel of claim 1, wherein:
the first and second bus lines are electrically connected to each of the plurality of electrodes through the other end of each electrode.

9. The liquid crystal lens panel of claim 7, wherein:
a number of the first and second bus lines is substantially the same as a number of the first and second electrodes.

10. The liquid crystal lens panel of claim 1, wherein:
the first and second bus lines extend to surround at least a portion of the lens area.

11. The liquid crystal lens panel of claim 1, wherein:
at least one driving circuit is disposed in the peripheral area and each of the first and second bus lines is applied with a different voltage level from the driving circuit.

12. The liquid crystal lens panel of claim 1, wherein:
the liquid crystal lens panel is operated in a two dimensional mode and a three dimensional mode.

13. A liquid crystal lens panel, comprising:
a substrate;
a plurality of electrodes;
a first bus line layer including a plurality of first bus lines; and
a second bus line layer including a plurality of second bus lines,
wherein the second bus line layer is disposed over the first bus line layer in a first direction that is substantially vertical to a surface of the substrate,
wherein the first bus lines are electrically insulated from the second bus lines without any contact between the first bus lines and the second bus lines,
wherein each of the first bus lines is alternately arranged with respect to each of the second bus lines along a second direction that is substantially vertical to the first direction, and
wherein the plurality of electrodes is electrically connected to the first and second bus lines.

* * * * *